(12) United States Patent
Pacella et al.

(10) Patent No.: US 11,354,437 B2
(45) Date of Patent: Jun. 7, 2022

(54) SYSTEM AND METHODS FOR PROVIDING DATA ANALYTICS FOR SECURE CLOUD COMPUTE DATA

(71) Applicant: Verizon Patent and Licensing Inc., Arlington, VA (US)

(72) Inventors: Dante J. Pacella, Charles Town, WV (US); Deepak Karpoor, Fairfax, VA (US); Paritosh Tyagi, Boyds, MD (US); Ashish Sardesai, Ashburn, VA (US); Saravanan Mallesan, Fairfax, VA (US); Mani Tadayon, Leesburg, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 392 days.

(21) Appl. No.: 16/537,832

(22) Filed: Aug. 12, 2019

(65) Prior Publication Data
US 2021/0049299 A1 Feb. 18, 2021

(51) Int. Cl.
*G06F 21/62* (2013.01)
*G06F 21/60* (2013.01)
*H04L 9/32* (2006.01)
*G06F 21/64* (2013.01)

(52) U.S. Cl.
CPC ........ *G06F 21/6254* (2013.01); *G06F 21/602* (2013.01); *H04L 9/3236* (2013.01); *G06F 21/64* (2013.01); *G06F 2221/2149* (2013.01)

(58) Field of Classification Search
CPC .... G06F 21/6254; G06F 21/602; G06F 21/64; G06F 2221/2149; H04L 9/3236
See application file for complete search history.

(56) References Cited

U.S. PATENT DOCUMENTS

| | | | |
|---|---|---|---|
| 10,783,270 B2* | 9/2020 | Ithal | G06F 16/2255 |
| 10,902,133 B2* | 1/2021 | Williams | G06F 21/6245 |
| 10,956,585 B2* | 3/2021 | Ortiz | H04L 9/3247 |
| 2017/0201498 A1* | 7/2017 | Baig | H04L 63/0428 |
| 2017/0264619 A1* | 9/2017 | Narayanaswamy | G06F 16/951 |
| 2019/0362083 A1* | 11/2019 | Ortiz | G06F 21/71 |
| 2020/0014527 A1* | 1/2020 | Subramaniam | H04L 9/0825 |
| 2020/0028926 A1* | 1/2020 | Sprague | H04L 9/0877 |
| 2020/0076578 A1* | 3/2020 | Ithal | G06F 16/2255 |

(Continued)

OTHER PUBLICATIONS

"Mnist data set", https://www.tensorflow.org/datasets/catalog/mnist. 3 pages, Last updated May 21, 2020.

(Continued)

*Primary Examiner* — Joseph P Hirl
*Assistant Examiner* — Stephen T Gundry (57) ABSTRACT

Systems and methods described herein enable data analytics for secure cloud compute data that protects the integrity and confidentiality of the underlying data. A network device in a network creates an instance of a Trusted Execution Environment (TEE). The network device generates, in the TEE instance, transactional data that includes private information and removes the private information from the transactional data to generate extracted data. The network device encrypts, within the TEE instance, the extracted data and exports the encrypted extracted data to a memory outside of the TEE instance.

20 Claims, 7 Drawing Sheets

(56) References Cited

U.S. PATENT DOCUMENTS

| | | | | |
|---|---|---|---|---|
| 2020/0097679 | A1* | 3/2020 | Fisse | G06F 21/6254 |
| 2020/0134200 | A1* | 4/2020 | Williams | H04L 9/0827 |
| 2020/0159961 | A1* | 5/2020 | Smith | G06V 40/20 |
| 2020/0204527 | A1* | 6/2020 | Vass | G06Q 20/3567 |
| 2020/0250295 | A1* | 8/2020 | Padmanabhan | G06F 21/6254 |
| 2020/0366653 | A1* | 11/2020 | Caceres | H04L 63/0853 |
| 2021/0004479 | A1* | 1/2021 | Ithal | H04L 9/0891 |
| 2021/0034602 | A1* | 2/2021 | Levacher | G06N 20/00 |
| 2021/0034608 | A1* | 2/2021 | Antonatos | G06F 16/245 |
| 2021/0334408 | A1* | 10/2021 | Walcott | G06Q 30/0269 |
| 2021/0406386 | A1* | 12/2021 | Ortiz | G06F 21/604 |

OTHER PUBLICATIONS

"Palisade Homomorphic Encryption Software Library", An Open-Source Lattice Crypto Software Library, https://palisade-crypto.org/. [Accessed Apr. 20, 2020].

"TF-encrypted", https://tf-encrypted.io/. [Accessed Apr. 20, 2020].

Albrecht, et al., "Homomorphic Encryption Standard", http://homomorphicencryption.org/wp-content/uploads/2018/11/HomomorphicEncryptionStandardv1.1.pdf. [Accessed Apr. 20, 2020]. 33 pages, Nov. 21, 2018.

Bajard, et al., "A Full RNS Variant of FV like Somewhat Homomorphic Encryption Schemes", International Conference on Selected Areas in Cryptography, 29 pages, 2016.

Beaver, et al., "The Round Complexity of Secure Protocols (Extended Abstract)", 22nd Annual ACM Symposium on Theory of Computing, pp. 503-513, 1990.

Ben-Or, et al., "Completeness Theorems for Non-Cryptographic Fault-Tolerant Distributed Computation (Extended Abstract)", 20th Annual ACM Symposium on Theory of Computing, pp. 1-10, 1988.

Brakerski, et al., "(Leveled) Fully Homomorphic Encryption without Bootstrapping", ACM Transactions on Computation Theory, vol. 6(3), No. 13, pp. 309-325, 2014.

Brakerski, "Fully Homomorphic Encryption without Modulus Switching from Classical GapSVP", Advances in Cryptology, p. 868-886, 2012.

Cheon, et al., "Homomorphic Encryption for Arithmetic of Approximate Numbers", Cryptology ePrint Archive: Report 2016/421, 2016. [Online]. Available: https://eprint.iacr.org/2016/421. [Accessed Apr. 4, 2020].

Columbus, "Roundup of Machine Learning Forecasts and Market Estimates, 2020", https://www.forbes.com/sites/louiscolumbus/2020/01/19/roundup-of-machine-learning-forecasts-and-market-estimates-2020/#5db5ecc65c02. © 2020 Forbes Media LLC., 22 pages, Jan. 19, 2020.

Dwork, et al., "The Algorithmic Foundations of Differential Privacy", Foundations and Trends(R) in Theoretical Computer Science vol. 9, Nos. 3-4 (2014) 211-407.

Evans, et al., "A Pragmatic Introduction to Secure Multi-Party Computation", https://securecomputation.org/docs/pragmaticmpc.pdf., NOW Publishers, 2018., 181 pages, (This version: Apr. 15, 2020).

Goldreich, et al., "How to play any Mental Game or a Completeness Theorum for Protocols with Honest Majority", 19th Annual ACM Symposium on Theory of Computing, pp. 218-229, 1987.

Kolesnikov, "Gate Evaluation Secret Sharing and Secure One-Round Two-Party Computation", Advances in Cryptology—ASIACRYPT 2005, p. 136-155, 2005.

Lecun, et al., "Gradient-Based Learning Applied to Document Recognition", http://vision.stanford.edu/cs598_spring07/papers/Lecun98.pdf, Proceedings of the IEEE, 46 pages, Nov. 1998.

Meehan, "Data Privacy Will Be the Most Important Issue in the Next Decade", https://www.forbes.com/sites/marymeehan/2019/11/26/data-privacy-will-be-the-most-important-issue-in-the-next-decade/#5eOeaa841882., © 2020 Forbes Media LLC., 5 pages, Nov. 26, 2019.

Polyakov, et al., "An improved rns variant of the bfv homomorphic encryption scheme", RSA(R) Conference 2019, San Francisco, CA, Moscone Center, Mar. 4-8, 2019.

Reinsel, et al., "Data Age 2025", The Digitization of the World From Edge to Core, IDC White Paper, Doc#US44413318, 28 pages, Nov. 2018.

Song, et al., "Stochastic Gradient Descent with differentially private updates", http://cseweb.ucsd.edu/~kamalika/pubs/scs13.pdf., 4 pages, 2013.

Stehlé, et al., "Making NTRU as Secure as Worst-Case Problems over Ideal Lattices", Advances in Cryptology—EUROCRYPT, vol. 6632, No. Lecture Notes in Computer Science, p. 27-47, 2011.

Thaine, "Perfectly Privacy-Preserving AI", https://towardsdatascience.com/perfectly-privacy-preserving-ai-c14698f322f5., 10 pages, Jan. 1, 2020.

Wagh, et al., "SecureNN: 3-Party Secure Computation for Neural Network Training", Proceedings on Privacy Enhancing Technologies, vol. 2019: Issue 3, 24 Pages.

Yao, "Protocols for Secure Computations (Extended Abstract)", 23rd Annual Symposium on Foundations of Computer Science, pp. 160-164, IEEE, 1982.

* cited by examiner

| Buyers | Sellers | Pricing Inputs | Locations | Services | SLA | Delivery |
|---|---|---|---|---|---|---|
| Buyer1 | Seller1 | Pre-agreed Pricing | Region, City, Street Address | DSx, Dark Fiber | TTR, Uptime | Start 1/1/2020 |
| Buyer2 | Seller2 | Dynamic Pricing | Region, City, Street Address | Broadband, 5G | Bandwidth/CIR | Exp. 12/31/2019 |
| Buyer3 | Seller3 | Discounts | Region, City, Street Address | Broadband, 5G | QoS | Suspended |

FIG. 7

SYSTEM AND METHODS FOR PROVIDING DATA ANALYTICS FOR SECURE CLOUD COMPUTE DATA

BACKGROUND

Cloud computing provides on-demand delivery of compute power, storage, applications, and other resources via the Internet. Data privacy is becoming an increasingly important issue to the extent that Secure Cloud Compute is rising as a solution enabled by Trusted Execution Environments (TEE) in a cloud platform. Secure Cloud Compute requires complex key management, encrypted storage, and a combination of hardware isolated trusted execution with software that isolates a "secure world" from a "normal world." In these environments, even the platform operators cannot access the private data being acted upon and stored within the secure world. While this solution is beneficial from a security and data integrity perspective, this restrictive access inhibits a platform operator from offering additional value to customers and suppliers in, for example, e-commerce environments.

DETAILED DESCRIPTION OF PREFERRED EMBODIMENTS

The following detailed description refers to the accompanying drawings. The same reference numbers in different drawings may identify the same or similar elements.

Businesses that perform e-commerce transactions typically generate private data, such as customer payment data, customer addresses and telephone numbers, discount data, and the like. To protect private data in a secure cloud computing environment (referred to herein as secure cloud compute), a hosted service may execute at least of portion of software instructions within a trusted execution environment (TEE), a secure element (SE), or other secure hardware/ software that is isolated from other network components.

Typically, a TEE will have "secure world" components connected to a larger system that has "normal world" (or non-secure world) components. In these examples, secure data is only unencrypted within the secure world. The secure world runs its own trusted OS and trusted applications. The main system's kernel, as well as any normal world systems, do not have access to the trusted OS and applications running within the secure world environment. In addition, each trusted application in the secure world can be isolated from other trusted applications.

As an example, if a marketplace service requires confidentiality in the transformation of transactional data such that a cloud platform operator and other buyers and sellers should not have knowledge of key aspects of the transaction, like pricing or discounts, that marketplace may require secure computing environments that isolate the transactional data from the platform operator. It may be desirable for the platform operator to provide data analytic services to its partners or customers using the isolated transaction data (e.g., data within the secure world compute and storage) without compromising the integrity and confidentiality of the underlying data.

Systems and methods described herein enable data analytics for secure cloud compute data that protects the integrity and confidentiality of the underlying data. The systems and methods, referred to herein as Zero Knowledge Analytics, may extract key data in the secure world, anonymize the key data, securely store and aggregate the key data, and perform analytics against the anonymized, aggregated data. For example, transactional data in a secure cloud computing environment may include a combination of private data and non-private data. Private data (such as names, addresses, and prices for a transaction) may be defined per regulations, third-party guidelines, customer requirements, or other sources. Non-private data (such as the name/description of a purchased product or service, a time period, a purchaser's region, a quantity of product, etc.) may become a valuable source for data analytics when accumulated and when the non-private data is separated from the private data in a manner so as to prevent access to or inference to the private data. According to an implementation described herein, the systems and methods may extract, anonymize, and aggregate non-private secure cloud compute data for use in analytics outside the secure cloud compute environment.

Figure 1:
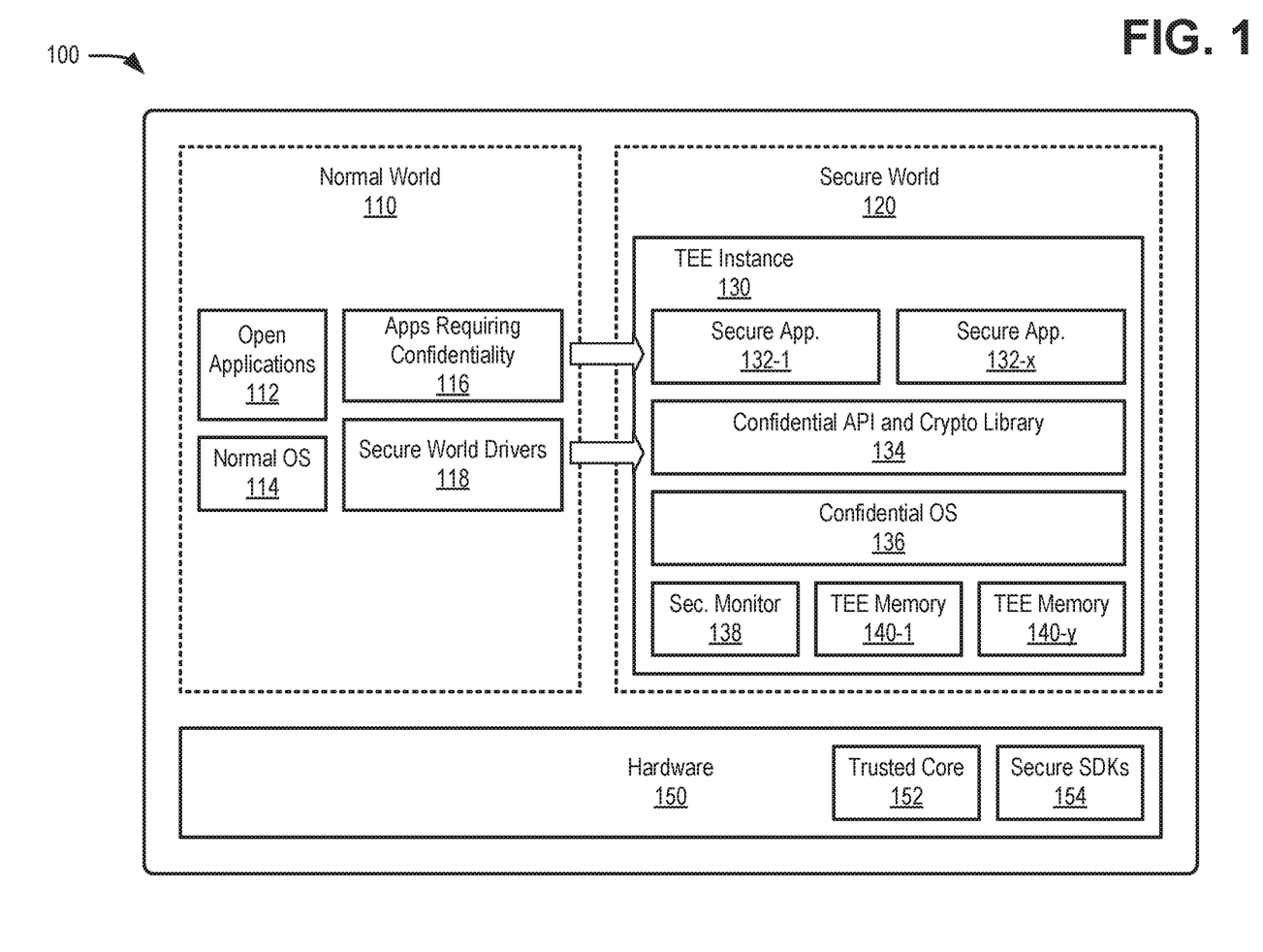
FIG. 1 is a block diagram of a network element for an exemplary secure cloud compute environment according to an implementation described herein.

FIG. 1 is a block diagram of a network element 100 for an exemplary secure cloud compute environment according to an implementation described herein. Network element 100 may include, for example, a network device, server device, computing device, etc. As shown in FIG. 1, network element 100 may include compute and storage services that are divided between a normal world 110 and a secure world 120.

Normal world 110 may include open applications 112, a normal operating system (OS) 114, applications requiring confidentiality 116 (also referred to as confidential applications 116), and secure world drivers 118. Open application 112 may include applications or services for client devices that do not use private customer information and, accordingly, do not require any interface with secure world 120. Open applications 112 may be accessed using normal OS 114, which similarly does not require any interface with secure world 120. According to implementations described herein, normal world 110 may include secure world drivers 118 that can communicate with to the secure world 120 and confidential applications 116 that may be written to rely on confidentiality provided from secure applications 132 in secure world 120.

Confidential applications 116 may include applications that may require collecting, generating, and/or storing private data (e.g., data that a customer/business may not want a platform operator, such a cloud service provider, to see). For example, confidential applications 116 may enable transactions, auctions, and exchanges between buyers and sellers. Confidential applications 116 may interface with a secure application (e.g., one of secure applications 132) in secure world 120 to have transactions and private data managed in a trusted execution environment (e.g., TEE instance 130). Secure world drivers 118 may include software code to access resources in secure world 120 via confidential application programming interfaces (APIs) and cryptographic library 134.

Secure world 120 may include one or more TEE instances 130. TEE instance 130 is a secure environment within a main processor or container of network element 100. The TEE instance 130 may run isolated from the main system using a parallel operating system (e.g., confidential OS 136) and specific drivers. Each TEE instance 130 may include one or more secure applications 132-1 through **132-*x* (referred to herein generically as secure application 132), a confidential API and cryptography library 134, confidential OS 136, a security monitor 138, and TEE memories 140-1 through 140-*y*. Secure application 132 may include a service or micro-service for client devices that use private customer information and, accordingly, require interface secure execution and storage. Secure application 132 may be accessed using confidential OS 136, which similarly does not interface with normal world 110**.

According to implementations described herein, applications 116 may direct a transaction request to secure application 132 to, for example, conduct a transaction that generates transactional data. The same or a different secure application 132 may remove private information from the transactional data to form extracted data (e.g., non-private data). Secure application 132 may encrypt, within the TEE instance 130, the extracted data and export the encrypted extracted data to a memory outside of TEE instance 130 (e.g., via normal world 110 or to a separate memory location).

Hardware 150 may include physical memory and processing components of network element 100 that can be configured to spin-up or tear-down a virtual entity (e.g., a containerized instance of normal world 110 and secure world 120) for a customer. According to an exemplary implementation, a cloud network (e.g., cloud network 210, described below) may share the resources of network element 110 among multiple virtual entities.

According to an implementation, hardware 150 may include a trusted core 152 and secure software development kits (SDKs) 154. Trusted core 152 may, for example, be partitioned to execute multiple virtual entities that can be assigned different normal worlds (e.g., normal world 110) and secure worlds (e.g., secure world 120) for different customers. SDKs 154 may assist and/or enable users to develop software applications for various end devices (e.g., end devices 250 in FIG. 2) to conduct secure transactions using cloud network 210. In one implementation. SDKs 154 may be used to identify private information fields and/or other private data, so that secure world 120 may safely extract the non-private (e.g., zero-knowledge) data for analytics.

The number and arrangement of components, illustrated in FIG. 1, is provided for explanatory purposes only. In practice, additional components, fewer components, different components, or differently-arranged components than those illustrated in FIG. 1 may be used. Also, in some implementations, one or more of the displayed components may perform one or more functions described as being performed by another one or more of the other components.

Figure 2:
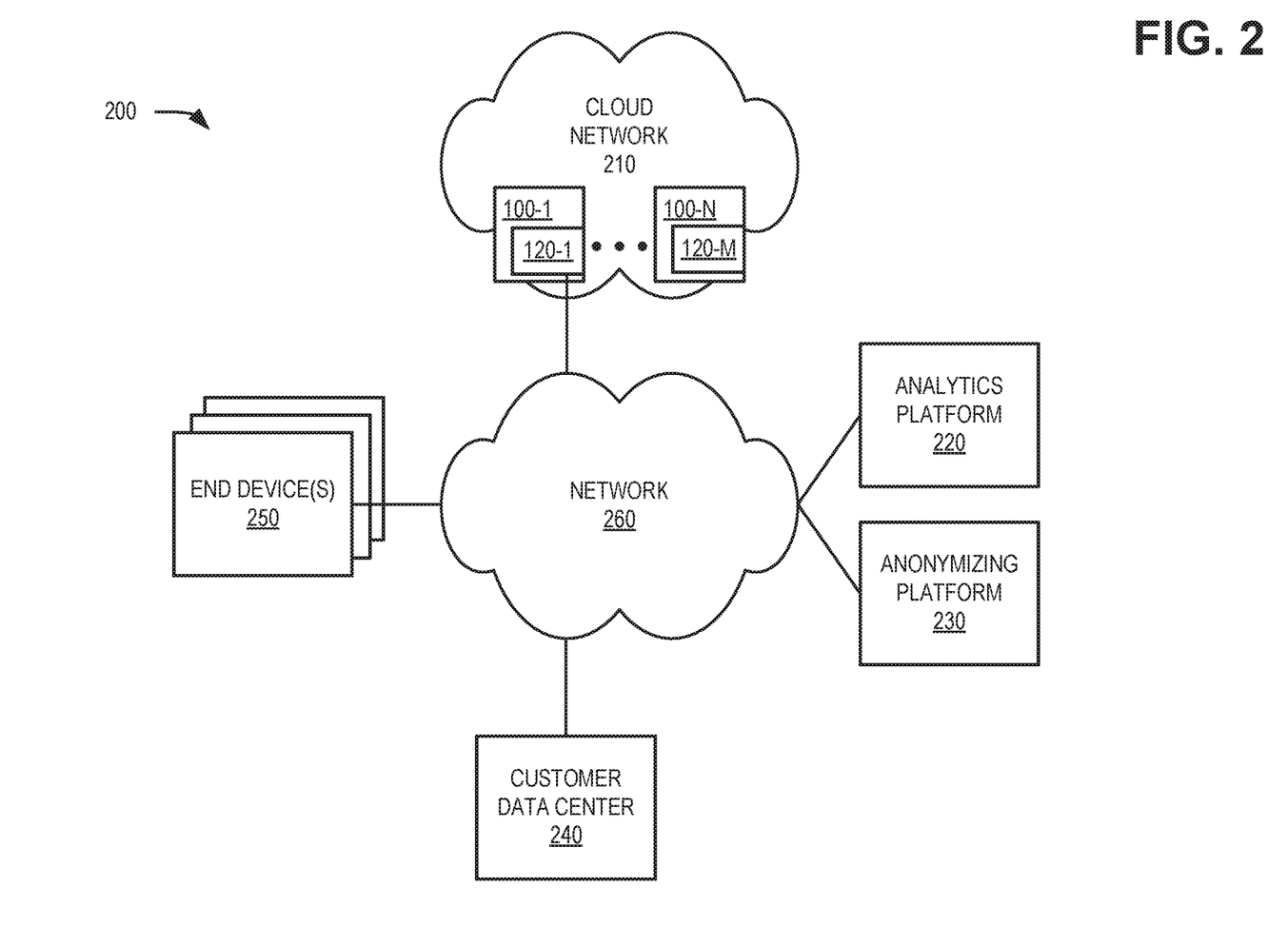
FIG. 2 is a diagram of an exemplary network environment in which network elements of FIG. 1 may be deployed.

FIG. 2 is a diagram of an exemplary network environment 200 in which network element 100 may be deployed. Network environment 200 may include a cloud network 210, an analytics platform 220, an anonymizing platform 230, a customer data center 240, and end devices 250, all interconnected by a network 260.

Cloud network 210 may include a service or an application-layer network or another type of network that hosts a user device application or service. According to an implementation, external network 160 may provide cloud compute services for a specific service provider network (e.g., Amazon Web Services (AWS), Microsoft Azure, Google Cloud, IBM IOT Bluemix, etc.). Depending on the implementation, cloud network 210 may include various network devices that provide various applications, services, or other type of user device assets, such as servers (e.g., web, application, cloud, etc.), mass storage devices, data center devices, and/or other types of network services pertaining to various network-related functions.

Cloud network 210 may be implemented using one or multiple technologies including, for example, network function virtualization (NFV), software defined networking (SDN), cloud computing, or another type of network technology. Depending on the implementation, cloud network 210 may include, for example, virtualized network functions (VNFs), multi-access (MA) applications/services, and/or servers. In addition to network elements 100, cloud network 210 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

As describe above in connection with FIG. 1, according to an implementation, cloud network 210 may include network elements 100, each configured with secure world 120. As described further herein, at least two different paths may be provided for extraction of non-private service data for use in Zero Knowledge Analytics. In one implementation, network elements 100 may extract, in secure world 120, the non-private data from the transaction data for use by analytics platform 220. In another implementation, network elements 100 may provide encrypted non-private data to anonymizing platform 230, which then sends the non-private data to analytics platform 220.

Analytics platform 220 may include one or more computing devices that analyze extracted data associated with cloud network 210. For example, analytics platform 220 may collect and collate extracted data generated by network elements 100 and/or anonymized extracted data forwarded through anonymizing platform 230. Analytics platform 220 may, for example, receive anonymized data from one set of transactions and store the anonymized data with data from other transactions (e.g., for other time periods, from other customers, etc.). Analytics platform 220 may apply one or more algorithms to detect cumulative trends that may be provided to third parties (e.g., customers associated with customer data center 240). Cumulative trends may be presented, for example, as a Predictive Model Markup Language (PMML) model and/or situational real-time scoring.

Anonymizing platform 230 may include one or more computing devices to receive encrypted, extracted data from secure world 120 and perform anonymization techniques.

Anonymizing platform 230 may include, for example, a third-party auditing TEE or an autonomously managed TEE. According to an implementation, anonymizing platform 230 may receive client criteria for providing anonymization and may generate (e.g., based on the client criteria) a default workflow (e.g., for routing through multiple anonymizing proxy devices) to achieve the client criteria. As used herein, the terms "anonymize," "anonymized," and "anonymization" may refer to concepts of obfuscating an origin, identity, or other potentially private information associated with data transmitted from a device. However, these terms are not limited in scope to techniques that provide perfect identity masking. Anonymization and data de-identification are NP-Hard (non-deterministic polynomial-time hard) problems in computer science. It should be understood that, given time and resources, de-identified data generally may be re-identified by adding other external data elements.

Customer data center 240 may include a device or group of devices associated with a third party that may desire to receive and/or utilize anonymized data from network elements 100. For example, customer data center 240 may include computers or other communication devices to receive transactional data, gaming data, or other anonymized trend data from analytics platform 220. In another implementation, customer data center 240 may receive raw anonymized data. In another implementation, customer data center 240 may receive trend reports or other data compilations generated, for example, by analytics platform 220 without having access to underlying anonymized data.

End device 250 may include a computational or communication device. End device 250 may include, for example, a tablet computer, a smartphone, a personal computer, a laptop computer, a personal communications system (PCS) terminal (e.g., a smartphone that may combine a cellular radiotelephone with data processing and data communications capabilities), a gaming console, a global positioning system (GPS) device, a content recording device (e.g., a camera, a video camera, etc.), or other types of computation or communication devices. In another implantation, end device 250 may include an Internet of Things (IoT) device or machine-type communication (MTC) device for collecting and transmitting data. End device 250 may be used, for example, to initiate a transaction with a network element 100 that includes service data and/or private information.

Network 260 may include a local area network (LAN); an intranet; the Internet; a wide area network (WAN), such as a cellular network, a satellite network, a fiber optic network, a private WAN, or a combination of the Internet and a private WAN; etc., that is used to transport data. Although shown as a single element in FIG. 2, network 260 may include a number of separate networks that function to provide services to other components of FIG. 2.

In FIG. 2, the particular arrangement and number of components of network environment 200 are illustrated for simplicity. In practice there may be more cloud networks 210, analytics platforms 220, anonymizing platforms 230, customer data centers 240, end devices 250, or networks 260. For example, there may be hundreds or thousands of network elements 100 in cloud network 210.

Figure 3:
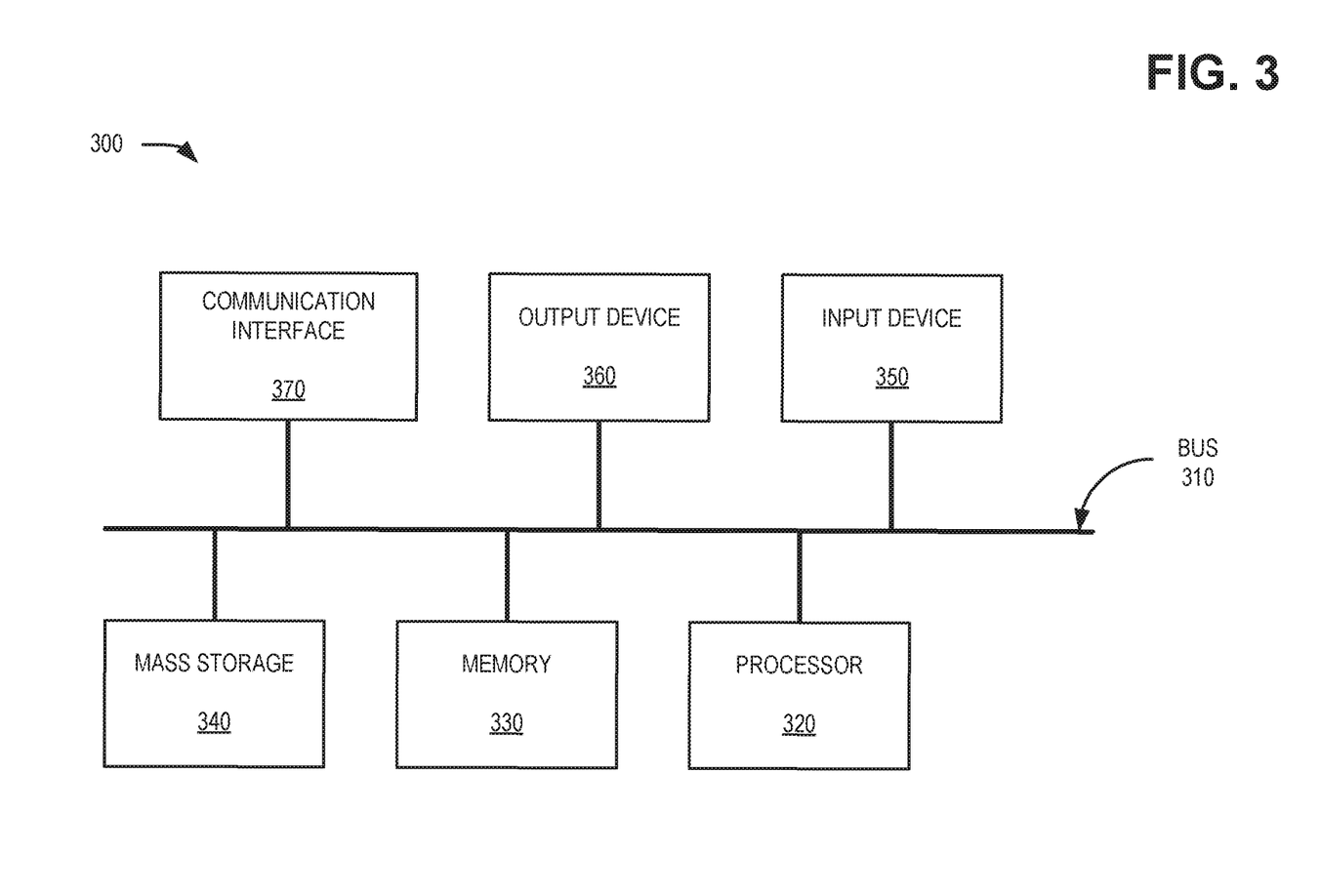
FIG. 3 is a block diagram illustrating exemplary components of a device that may correspond to the network elements and customer devices depicted in the environment of FIGS. 1 and 2.

FIG. 3 is a block diagram depicting exemplary components of a device 300 that may correspond to one of analytics platform 220, anonymizing platform 230, customer data center 240, or end devices 250. Analytics platform 220, anonymizing platform 230, or customer data center 240 may include one or more devices 300. Device 300 may include a bus 310, a processor 320, a memory 330, mass storage 340, an input device 350, an output device 360, and a communication interface 370.

Bus 310 includes a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, the processor 320 may be an x86 based CPU, and may use any operating system, which may include varieties of the Windows, UNIX, and/or Linux. The processor 320 may also use high-level analysis software packages and/or custom software written in any programming and/or scripting languages for interacting with other network entities and providing applications to, for example, a plurality of end devices 250 which are communicatively coupled to cloud network 210.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, and/or a removable form of memory, such as a flash memory. Mass storage device 340 may include any type of on-board device suitable for storing large amounts of data, and may include one or more hard drives, solid state drives, and/or various types of redundant array of independent disks (RAID) arrays. Mass storage device 340 may be suitable for storing files associated with applications 112/132 for distribution to, for example, analytics platform 220.

Input device 350, which may be optional, can allow an operator to input information into device 300, if required. Input device 350 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 350. Output device 360 may output information to an operator of device 300. Output device 360 may include a display (such as an LCD), a printer, a speaker, and/or another type of output device. In some embodiments, device 300 may be managed remotely and may not include output device 360.

Communication interface 370 may include a transceiver that enables device 300 to communicate over network 260 with other devices and/or systems. The communications interface 370 may be a wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 370 may include a transmitter that converts baseband signals to RF signals and/or a receiver that converts RF signals to baseband signals. Communication interface 370 may be coupled to one or more antennas for transmitting and receiving RF signals. Communication interface 370 may include a logical component that includes input and/or output ports, input and/or output systems, and/or other input and output components that facilitate the transmission/reception of data to/from other devices. For example, communication interface 370 may include a network interface card (e.g., Ethernet card) for wired communications and/or a wireless network interface (e.g., a Wi-Fi) card for wireless communications. Communication interface 370 may also include a USB port for communications over a cable, a Bluetooth wireless interface, an RFD interface, an NFC wireless interface, and/or any other type of interface that converts data from one form to another form.

As described below, device 300 may perform certain operations relating to establishing secure element policy management. Device 300 may perform these operations in response to processor 320 executing software instructions contained in a computer-readable medium, such as memory 330 and/or mass storage 340. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3.

Figure 4:
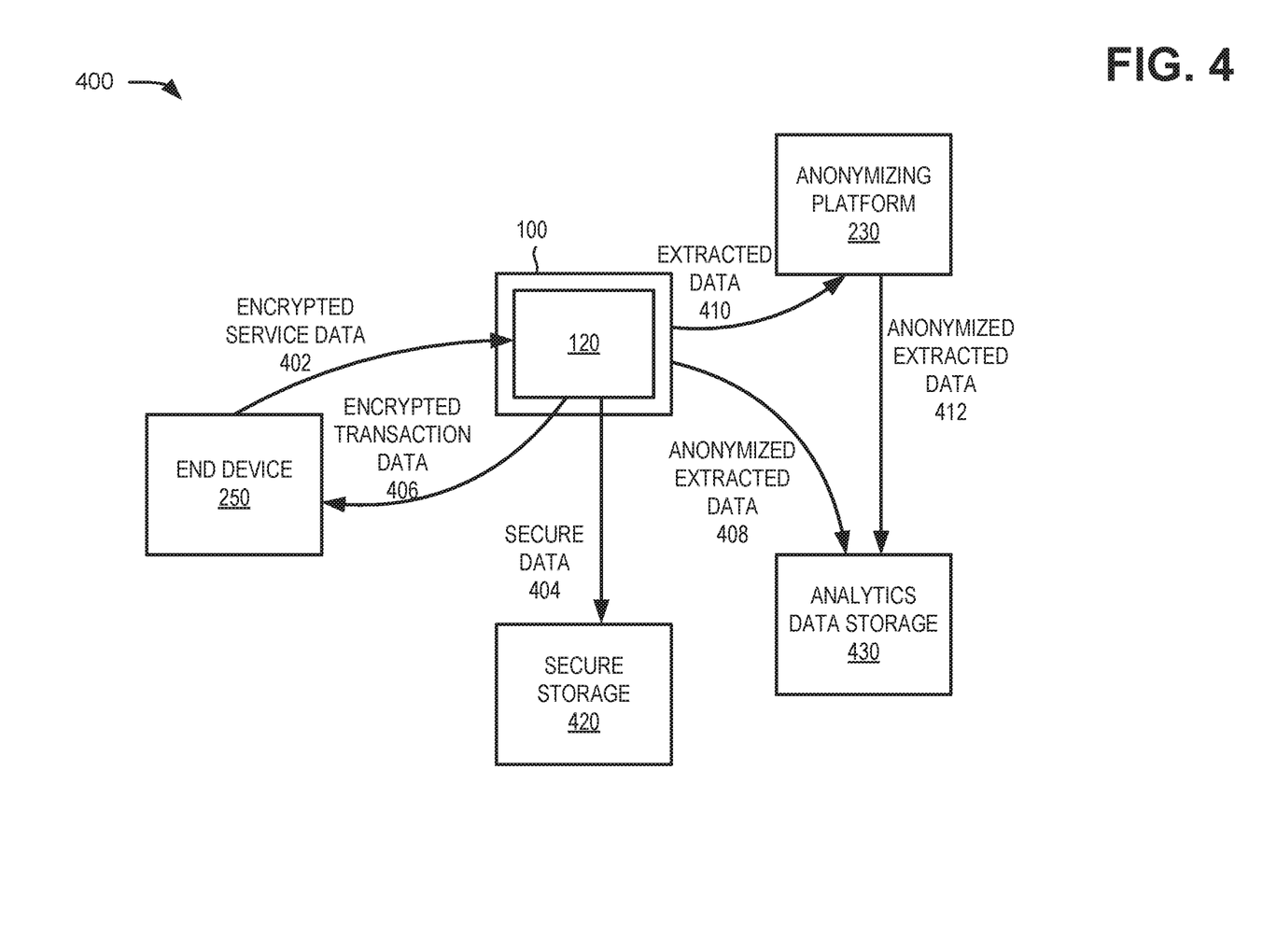
FIG. 4 is a diagram of exemplary communications for extraction of public service data from secure cloud compute data among devices in a portion of the network environment of FIG. 2.

FIG. 4 is block diagram showing exemplary communications in a portion 400 of network environment 200. Network portion 400 may include a network element 100 with secure world 120, anonymizing platform 230, end device 250, secure storage 420, and analytics data storage 430. Communications in FIG. 4 may correspond to the extraction of non-private service data for use in Zero Knowledge Analytics. For example, communications shown in FIG. 4 may relate to extraction of transactional information shown in FIG. 5. Communications shown in FIG. 4 provide simplified illustrations of communications in network portion 400 and are not intended to reflect every signal or communication exchanged between devices/functions.

Secure storage 420 and analytics data storage 430 may be, for example, separate storage components in (or associated with) cloud network 210. Access to secure storage 420 may be restricted to a specific customer, such as, for example, the specific secure world 120 that writes to secure storage 420. In contrast, analytics data storage 430 may be accessible to multiple entities, such as analytics platforms (e.g., analytics platform 220), customer data center 240, or third-party systems.

As shown in FIG. 4, end device 250 may provide encrypted service data 402 to network element 100. For example, customer data center 240 may send encrypted service data 402, such as Customer Proprietary Network Information (CPNI), to network element 100 using a secure key, which may be shared by secure world 120 for unencrypting the data.

Secure world 120 of network element 100 may receive encrypted service data 402, decrypt encrypted service data 402 (using, for example, a shared key), and provide secure compute services for the unencrypted data. In one implementation, secure world 120 may send encrypted secure data 404 to a secure storage 420. Secure storage 420 may include a database or anther data structure, to, for example, temporarily store in-process work/data when an instance associated with secure world 120 is not operating or at rest (e.g., a session between customer data center 240 and cloud network 210 is suspended). For example, in the event no active instances of secure world 120 are being used in cloud network 210, secure storage 420 may store encrypted data 404 until an active instance of secure world 120 is re-established in cloud network 210.

Secure world 120 of network element 100 may add service data associated with the customer identifiable data from encrypted service data 402 to generate the transactional data. Network element 100 may provide encrypted transaction data 406 from secure world 120 to end device 250. Encrypted transaction data 406 may include, for example, results of secure compute services provided in secure world 120 (e.g., prices specific to a particular location, service, bulk rate, etc.).

According to an implementation, a common encryption key (referred to herein as a class 1 key) may be used for encrypted secure world communications, including encrypted service data 402, encrypted data 404, and encrypted transaction data 406 related to a particular end device 250 or a group of related (e.g., commonly-owned) end devices 250. End device 250 may receive encrypted transaction data 406 and decrypt the data for customer use using the secure key (e.g., a class 1 key) shared with secure world 120.

Figure 5:
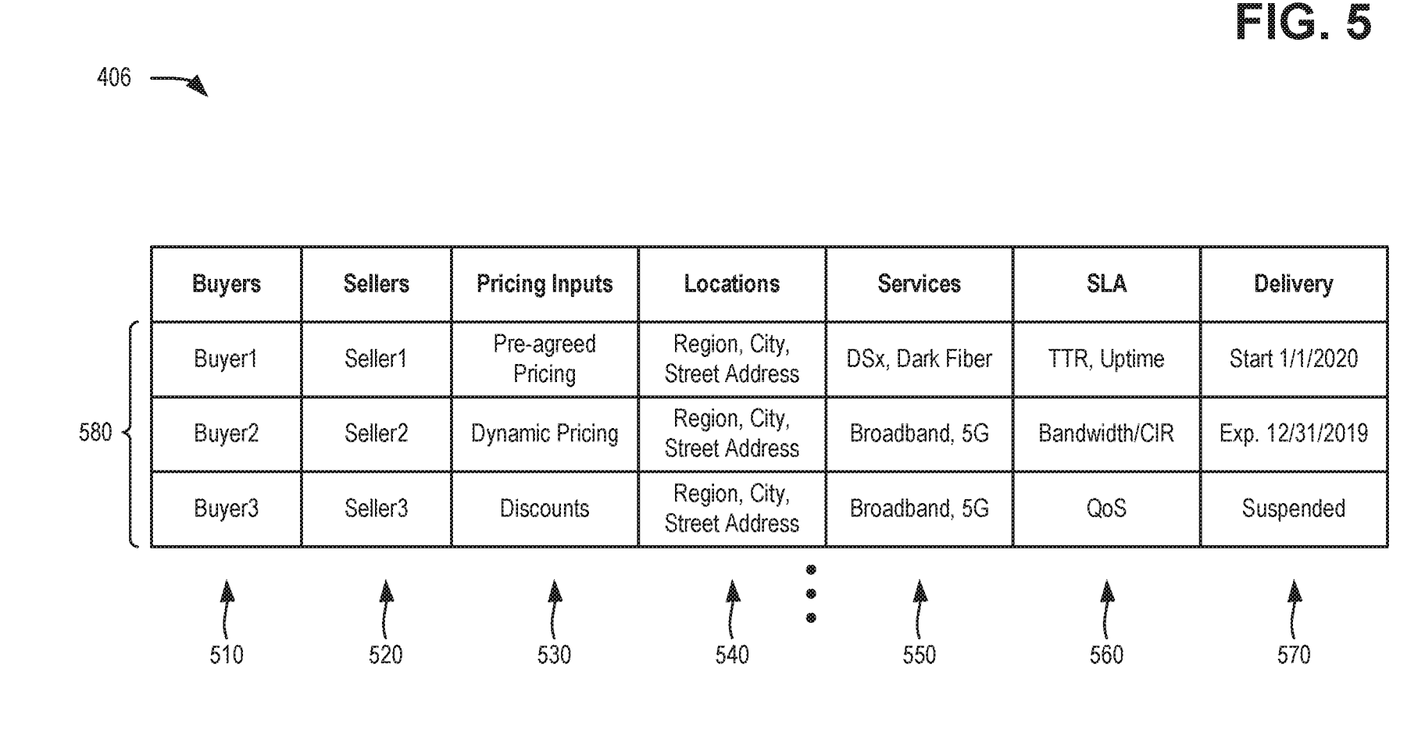
FIG. 5 is an example of transactional data fields that include both private and non-private data.

In one example, transaction data 406 may include information shown in FIG. 5. Referring to FIG. 5, transaction data 406 may include a buyers field 510, a sellers field 520, a pricing inputs field 530, a locations field 540, a services field 550, a service level agreement field (SLA) 560, a delivery field 570, and a variety of records or entries 580 associated with each of fields 510-570.

Buyers field 510 may include names (e.g., "Buyer1") of subscribers for, for example, telecommunications services or other services. Sellers field 520 may include, for example, names (e.g., "Seller1") of sellers or providers for the telecommunications services or other services. Pricing inputs field 530 may include pricing and/or pricing plans (e.g., "pre-agreed pricing," "dynamic pricing," "discounts") for the telecommunications services or other services. Locations field 540 may include subscriber locations, such as a region, city, and street address associated with a particular subscriber in buyers field 510. Services field 550 may include a description of the telecommunications services or other services purchased by a particular subscriber in buyers field 510, such as 4G services, 5G services, wired services, etc. SLA field 560 may include all or key terms of a SLA associated with the telecommunications services or other services purchased by a particular subscriber in buyers field 510, such as particular quality-of-service (QoS) levels, minimum bandwidth, time to repair (TTR), etc. Delivery field 570 may include, for example, service delivery terms, dates, etc., associated with the telecommunications services or other services purchased by a particular subscriber in buyers field 510.

In the example of FIG. 5, assume data in buyers field 510, sellers field 520, pricing inputs field 530, and street addresses in locations field 540 are considered private data. While data in the remaining fields of transaction data 406 may be considered non-private data. Thus, according to implementation described herein, non-private service data may be extracted and, if necessary, anonymized for use in Zero Knowledge Analytics.

Referring again to FIG. 4, according to implementations described herein, non-private data from transaction data 406 (e.g., along with non-private data from other end devices, not shown) may be provided to analytics platform 220. For example, with reference to the exemplary data fields of FIG.

5, non-private data from transaction data 406 may include regions/cities (e.g., from locations field 540), data from services field 550, data from SLA field 560, and data from delivery field 570. In one implementation, each secure world 120 writes its respective non-private data to an extracting data store directly (e.g., mounted through trusted drivers or secure hardware resources). In another implementation, the secure world 120 may pass the non-private data back to normal world 110 of network element 100. As described further below, in the example of FIG. 4, two different communication paths for sending the non-private data are provided between network element 100 and analytics data storage 430.

In an implementation of one communication path, encrypted anonymized extracted data 408 may be provided from network element 100 to analytics data storage 430. The encrypted extracted data 408 may include, for example, anonymized non-private information extracted from transaction data 406, such as regions/cities (e.g., from locations field 540), data from services field 550, data from SLA field 560, and data from delivery field 570 and/or transformed data in any other data field. In one implementation, secure world 120 may apply rules to meet minimum data thresholds or ensure other rules are met before anonymized extracted data 408 can be encrypted and provided for analytics. These rules may be collectively referred to herein as "anonymity thresholds." For example, before sending extracted data 408, secure world 120 may be required to collect records from a certain threshold number of different buyers (e.g., from buyers field 510) or suppliers (e.g., from sellers field 520), a minimum number of entries per category or region (e.g., from locations field 540), or other such factors that could otherwise be used to discern identity from anonymous data. In other implementations, secure world 120 may transform data in one or more data fields of extracted data 408 to obfuscate/anonymize the data fields. For example, secure world 120 may apply a hash algorithm to anonymize certain private data fields. The transformed data may, for example, be needed to maintain a data sequence and/or be used to distinguish between private data of different records without disclosing actual private information. According to another implementation, a collection of records may be required to meet multiple anonymity thresholds before being forwarded as encrypted anonymized extracted data 408. The encryption key (referred to herein as a class 3 key) for anonymized extracted data 408 may be different than the encryption used, for example, for a TEE instance 130. That is, the encryption for anonymized extracted data 408 may be provided for purposes of access control by analytic systems, for example.

In an implementation of the other communication path, extracted data 410 may be provided from network element 100 to anonymizing platform 230. In one implementation, extracted data 410 may include the same or similar fields as described above for extracted data 408. According to an implementation, extracted data 410 may include individual records or groups of records that require anonymization. Extracted data 410 may be encrypted. According to an implementation, a different encryption key (referred to herein as a class 2 key) may be used for extracted data 410 than is used for encrypted service data 402, encrypted data 404, and encrypted transaction data 406. For example, the class 2 key may be uniquely created by the anonymizing platform 230 in isolation from secure world 120 and analytics platform 220.

Anonymizing platform 230 may apply similar rules as used for extracted data 408 to meet minimum data thresholds or ensure other rules are met before providing extracted data 410 to anonymizing platform 230. Anonymizing platform 230 may receive encrypted extracted data 410, decrypt extracted data 410, and provide anonymization services. For example, anonymizing platform 230 may provide an anonymization path (e.g., via multiple proxy devices, not shown) and/or perform obfuscation steps (e.g., transformation, hashes, etc.) on particular types of data, as well as encryption/decryption schemes. In one implementation, anonymizing platform 230 may be managed by a third party (e.g., different from an owner of cloud network 210 or customer data center 240). After anonymization, anonymizing platform 230 from forward anonymized extracted data 412 to analytics data storage 430. Anonymized extracted data 412 may or may not be encrypted. According to an implementation, if encrypted, anonymized extracted data 412 may use the same encryption key (e.g., a class 3 key) as extracted data 408.

According to another implementation of the other communication path, anonymizing platform 230 may receive extracted data 410 and securely open, transform, and store data extracted from network element 100 via secure world 120. In this type of implementation, even private data, such as pricing information may be included in extracted data 410 and can be compared against rolling averages, trends, or other functions. In this case, only a trend or rolling average may be reported for general platform use (e.g., as anonymized extracted data 412).

Data stored in analytics data storage 430 may be made accessible to data analytics systems, such as analytics platform 220. In one example, analytics platform 220 may be provided an encryption key (e.g., a class 3 key) to access data in analytics data storage 430. The encryption key may permit access to all or a subset of data in analytics data storage 430. A service provider or authorized third party may, for example, use analytics data storage 430 to analyze aggregated data combined from multiple transactions, buyers, suppliers, regions, etc., without being able to identify corresponding private data from the transactions. Thus, as an illustration, analytics platform 220 may be used to identify the number of sales in a region for a particular product or service without relying on private customer data. As another illustration, analytics platform 220 could identify a number of sales in a region for similar/competing products without accessing private customer data.

Figure 6:
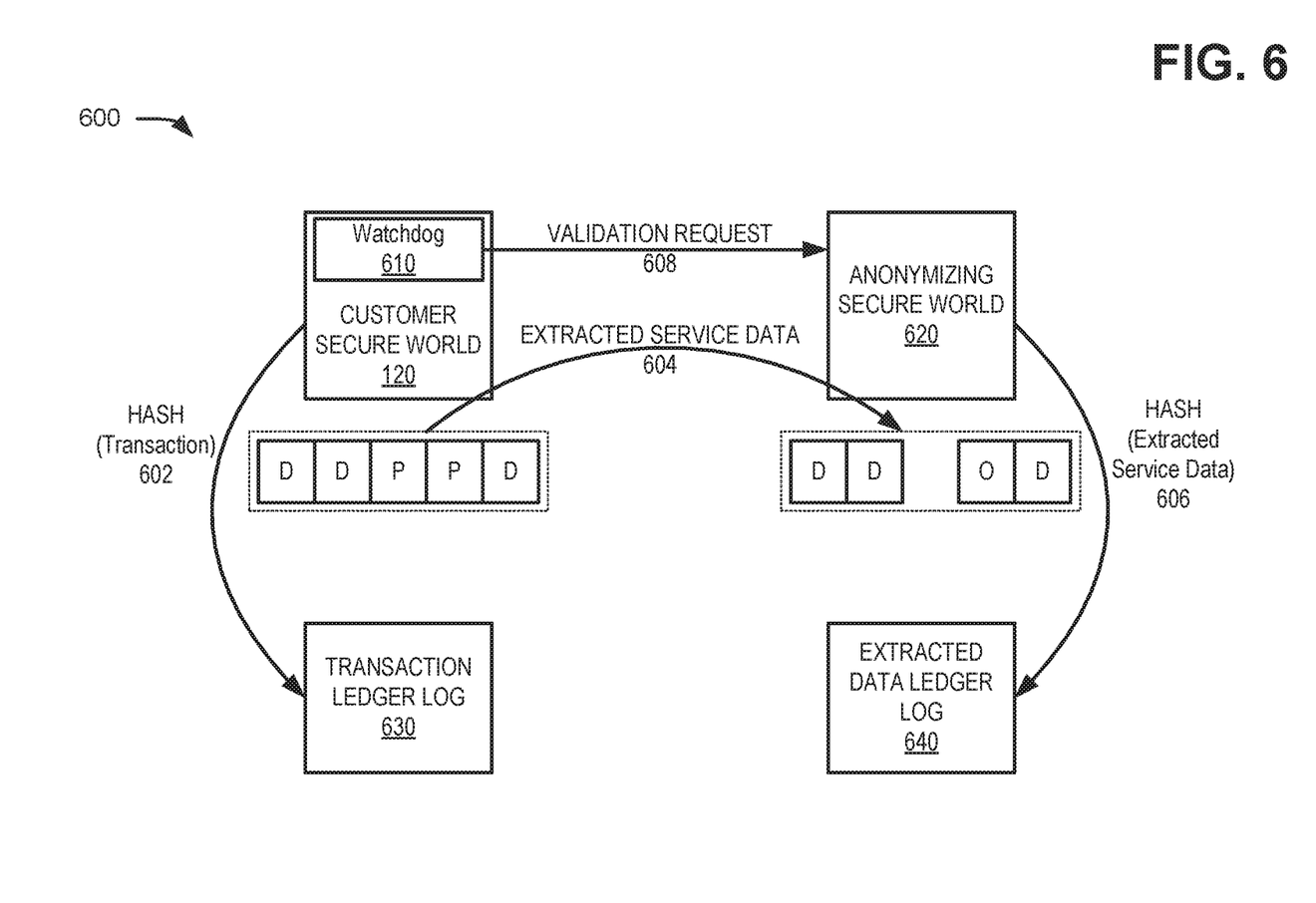
FIG. 6 is a diagram of exemplary communications for a data verification process among devices in a portion of the network environment of FIG. 2, according to an implementation described herein.

FIG. 6 is block diagram showing exemplary communications for a data verification process in a portion 600 of network environment 200. More particularly, communications in FIG. 6 show a verification service within an anonymizing instance of anonymizing platform 230. Network portion 600 may include secure world 120 of network element 110 and an anonymizing secure world 620. Anonymizing secure world 620 may correspond, for example, a network function within anonymizing platform 230.

As shown in FIG. 6, secure world 120 may include a watchdog application 610. Watchdog application 610 may include a process running in customer secure world 120 that verifies that the exact same service data was included in both the transaction and extracted data. Watchdog application 610 may sign the extracted data going to anonymizing service.

The data verification process uses hashing to verify a transaction, such as a transaction with encrypted transaction data 406. A hash 602 of a transaction (e.g., encrypted transaction data 406) may be written to a transaction ledger log 630 as evidence for a potential dispute resolution between a buyer and a seller. Extracted service data 604 may be sent from secure world 120 to anonymizing secure world 620. As illustrated in FIG. 6, secure world 120 may remove private data fields ("P"), or private portions of data fields, and/or transform private data fields to form extracted service data 604 that includes only obfuscated ("O") or non-private service data fields ("D"). As noted above, private data fields may be determined, for example, based on regulations, third-party guidelines, customer requirements, or other sources and their identification as private data field may be incorporated into TEE instances 130 of secure world 120 via use of SDKs (e.g., SDKs 154).

Anonymizing secure world 620 may receive extracted service data 604 and may generate a hash 606 of extracted service data 604 using a different hash algorithm than the algorithm used for hash 602 of the transaction. As an example, the transaction hash 602 may use the BLAKE2b hash function and the extracted data hash 606 may use the KECCAK256 hash function, so that the hashes cannot be compared. Hash 606 of the extracted service data may be written to a separate extracted data ledger log 640.

To prevent polluted data from entering the analytics, anonymizing secure world 620 may "wash" the data such that signal intelligence is reduced to near zero. According to an implementation, pseudonyms may be used between the anonymizing secure world 620 and secure world 120. For example, a unique identity and keys can be used between the anonymizing secure world 620 and each secure world 120. If identity verification is required for a customer (e.g., customer data center 240), the platform operator (e.g., for cloud network 210) can receive a request for an anonymous registration for their container (e.g., the container including customer secure world 120 on cloud network 210). The platform operator, using watchdog application 610, can perform an asymmetric zero knowledge validation on behalf of the customer by providing validation request 608 to the anonymizing secure world 620. Validation request 608 may include the secure world name for the container of customer secure world 120 and not reveal any other identifying data. The anonymizing secure world 620 may assign a new identity and keys to the secure world 120 and send the new identity and keys directly to the container for secure world 120. Anonymizing secure world 620 and secure world 120 may then communicate directly over a secure channel, providing anonymity on both input to and output from anonymizing secure world 620.

For data verification, secure world 120 may generate a first hash value from the extracted data 604, and anonymizing secure world 620 may generate a second hash value from the extracted data 604 (e.g., as stored in extracted data ledger log 640). Customers may for example, validate the extracted data based on a comparison of the first and second hash values.

Figure 7:
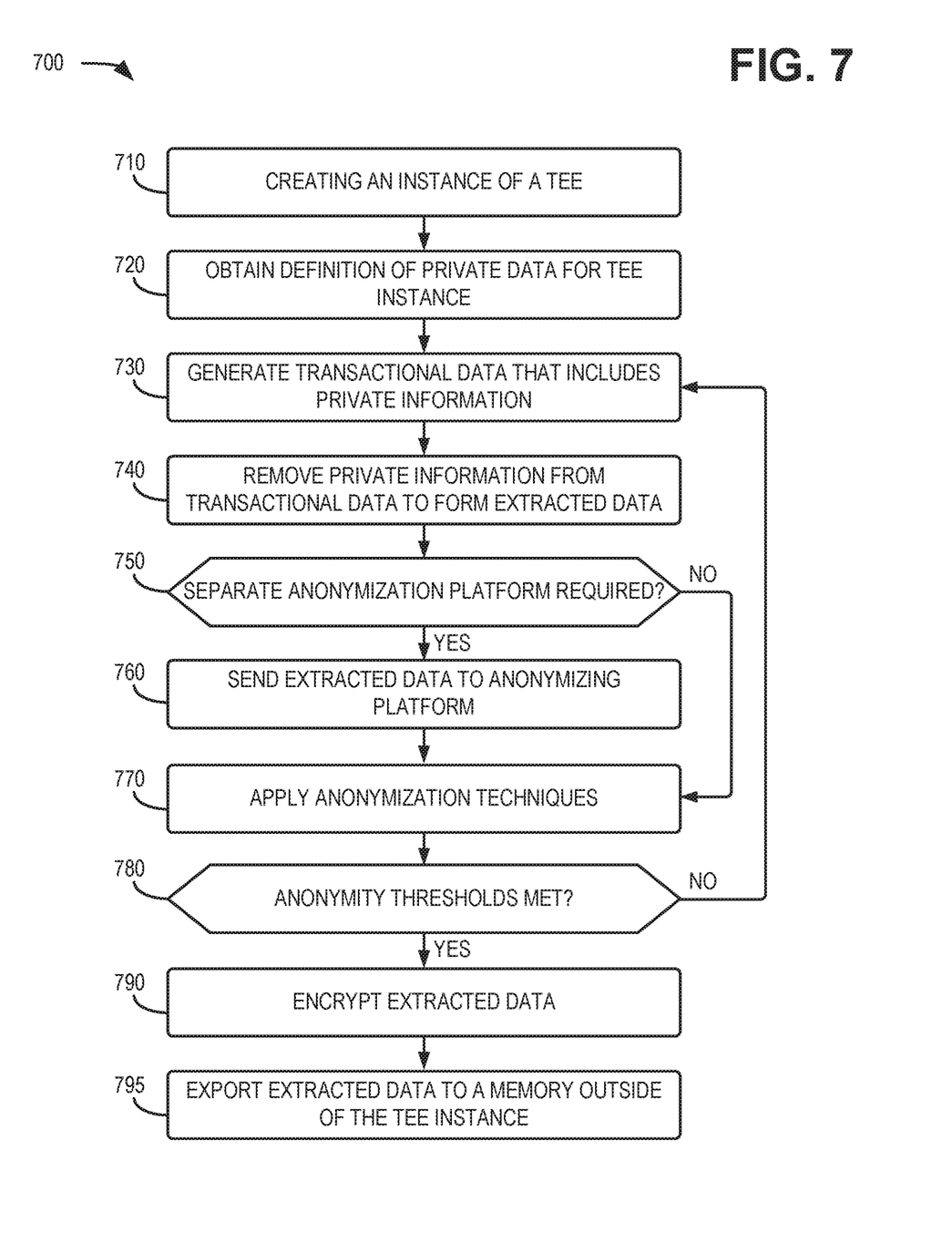
FIG. 7 is a flow diagram illustrating an exemplary process for enabling data analytics for secure cloud compute data that protects the integrity and confidentiality of the underlying data.

FIG. 7 is a flow diagram illustrating an exemplary process 700 for enabling data analytics for secure cloud compute data that protects the integrity and confidentiality of the underlying data. In one implementation, process 700 may be performed by network element 100. In another implementation, some or all of process 700 may be performed by network element 100 in conjunction with another device or group of devices, such as anonymizing platform 230 or end device 250.

As shown in FIG. 7, process 700 may include creating an instance of a TEE (block 710) and obtaining, by the TEE instance, a definition of private data (block 720). For example, network element 100 may instantiate an instance of normal world 110 and secure world 120 to provide transactional services for end devices 250 associated with a customer (e.g., customer data center 240). The customer may provide and/or agree to privacy settings for transactional data which may be stored, for example, in TEE instance 130. The privacy settings may identify, for example, particular data fields or data within particular fields that shall remain within the customer secure world 120.

Process 700 may further include generating transactional data that includes private information (block 730) and removing the private information from the transactional data to form extracted data (block 740). For example, an end device 250 may initiate a transaction and send encrypted service data 402 with private information. Secure world 120 may receive the encrypted service data 402, decrypt the data, and extract non-private information based on the privacy settings.

Process 700 may additionally include determining if a separate anonymization platform is required (block 750). For example, network element 100 may determine if an anonymizing platform (e.g., anonymizing platform 230) is configured to receive extracted data (e.g., extracted data 410). If separate anonymization is required (block 750—Yes), the extracted data may be sent to an anonymizing platform (block 760). For example, secure world 120 may encrypt and forward the extracted data (e.g., extracted data 410) to anonymizing platform 230.

If separate anonymization platform is not required (block 750—No), or after sending the extracted data to anonymizing platform (block 760), process 700 may additionally include applying anonymization techniques (block 770). For example, depending on the privacy settings or arrangement by the service provider, network element 100 or anonymizing platform 230 may be required to provide further anonymization techniques to the extracted data, such as compiling sufficient data amounts to ensure anonymity, transforming data fields to obfuscate certain data, and/or routing extracted data through an anonymizing path.

Process 700 may also include determining if anonymity thresholds are met (block 780). For example, secure world 120 or anonymizing platform 230 may apply one or more anonymity thresholds to ensure a sufficient amount of records exist to prevent, for example, association of a data record with a particular customer. If the anonymity thresholds are not met (block 780—No), process 700 may return to process block 730 to collect more transactional data.

If the anonymity thresholds are met (block 780—Yes), process 700 may include encrypting the extracted data (block 790) and exporting the encrypted extracted data to a memory outside of the TEE instance (block 795). For example, secure world 120 or anonymizing platform 230 may encrypt the collected extracted data (e.g., anonymized extracted data 408 or anonymized extracted data 412) and forward the encrypted extracted data to analytics data storage 430 outside of secure world 120.

Systems and methods described herein enable data analytics for secure cloud compute data that protects the integrity and confidentiality of the underlying data. According to an implementation, a network device in a network creates an instance of a TEE. The network device generates, in the TEE instance, transactional data that includes private information and removes the private information from the transactional data to form extracted data. The network device encrypts, within the TEE instance, the extracted data and exports the encrypted extracted data to a memory outside of the TEE instance.

The systems and methods described herein contrast with, for example, Hardware Security Modules (HSMs), which are offered as a solution to encrypt stored information. HSM solutions only offer a partial remedy for analytics, as the encrypted data must be unencrypted to be processed by a CPU or other processing unit or before handing off to platform analytic services, which can, thus, leave unencrypted private data exposed outside a secure world.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, while examples described herein have been primarily described in the context of transactional data with private customer information, implementations described herein may apply to other types of data exchanges that include private information. Thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 320, etc.), or a combination of hardware and software (e.g., software 335).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 220) of a device. A non-transitory storage medium includes one or more of the storage mediums described in relation to memory 330.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method, comprising:
    generating, by a trusted execution environment (TEE) instance of a network device, transactional data that includes private information;
    removing, by the TEE instance, the private information from the transactional data to generate extracted data;
    collecting, by the TEE instance, records of the extracted data until an anonymity threshold is met;
    encrypting, by the TEE instance, the extracted data; and
    exporting, by the TEE instance, the extracted data to a memory outside of the TEE instance when the anonymity threshold is met.

2. The method of claim 1, wherein generating the transactional data includes:
    receiving, by the TEE instance and from a customer device, customer identifiable data; and
    adding, by the TEE instance, service data associated with the customer identifiable data, to generate the transactional data.

3. The method of claim 1, wherein removing the private information from the transactional data further comprises:
    obtaining, by the TEE instance, a definition of private data; and
    applying, by the TEE instance, the definition to the transactional data.

4. The method of claim 1, wherein exporting the extracted data comprises:
    sending the extracted data to an anonymizing platform that generates anonymized extracted data, and storing the anonymized extracted data in the memory outside of the TEE instance, wherein the extracted data is available for analytics without revealing the private information.

5. The method of claim 4, wherein storing the anonymized extracted data includes storing the anonymized extracted data in an unencrypted format.

6. The method of claim 1, wherein exporting the extracted data comprises:
storing the collected records in the memory outside of the TEE instance, wherein the extracted data is available for analytics without revealing the private information.

7. The method of claim 6, wherein storing the collected records includes storing the collected records in an encrypted format.

8. The method of claim 1, wherein the private information includes customer proprietary network information (CPNI).

9. The method of claim 1, further comprising:
generating a first hash value from the extracted data;
receiving a second hash value of the extracted data; and
validating the extracted data based on a comparison of the first and second hash values.

10. The method of claim 1, further comprising:
receiving the extracted data from the TEE instance;
decrypting the extracted data to form unencrypted extracted data; and
anonymizing the unencrypted extracted data to form anonymized unencrypted extracted data.

11. A network device, comprising:
a communication interface;
a memory configured to store an instance of a Trusted Execution Environment (TEE); and
a processor configured to execute instructions stored in the memory to:
generate, in the TEE instance, transactional data that includes private information,
remove, within the TEE instance, the private information from the transactional data to form extracted data,
collect, within the TEE instance, records of the extracted data until an anonymity threshold is met;
encrypt, within the TEE instance, the extracted data, and
export the encrypted extracted data to a memory outside of the TEE instance after the anonymity threshold is met.

12. The network device of claim 11, wherein the processor is further configured to execute the instructions stored in the memory to:
receive, from a customer device and within the TEE instance, customer identifiable data; and
add, within the TEE instance, service data associated with the customer identifiable data, to generate the transactional data.

13. The network device of claim 11, wherein, when removing the private information from the transactional data, the processor is further configured to execute the instructions stored in the memory to:
obtain a definition of private data as configured by a customer; and
apply the definition to the transactional data.

14. The network device of claim 11, wherein, when exporting the encrypted extracted data, the processor is further configured to execute the instructions stored in the memory to:
send the extracted data to an anonymizing platform that generates anonymized extracted data.

15. The network device of claim 11, wherein, when exporting the encrypted extracted data, the processor is further configured to execute the instructions stored in the memory to:
store the collected records as the extracted data outside of the TEE instance, wherein the extracted data is available for analytics without revealing the private information.

16. The network device of claim 11, wherein the processor is further configured to execute the instructions stored in the memory to:
generate a first hash value from the extracted data;
receive, from another network device, a second hash value of the extracted data; and
validate the extracted data based on a comparison of the first and second hash values.

17. The network device of claim 11, wherein the processor is further configured to execute the instructions stored in the memory to:
anonymize the extracted data to form anonymized unencrypted extracted data.

18. A non-transitory computer-readable medium storing instructions executable by a computational device to:
create an instance of a Trusted Execution Environment (TEE) in a network device;
generate, in the TEE instance, transactional data that includes private information;
remove, within the TEE instance, the private information from the transactional data to generate extracted data;
collect, within the TEE instance, records of the extracted data until an anonymity threshold is met;
encrypt, within the TEE instance, the extracted data; and
export the encrypted extracted data to a memory outside of the TEE instance when the anonymity threshold is met.

19. The non-transitory computer-readable medium of claim 18, wherein the instructions are further executable by a computational device to:
send the extracted data to an anonymizing platform that generates anonymized extracted data from the extracted data, and
store the anonymized extracted data in a memory outside of the TEE instance, wherein the extracted data is available for analytics without revealing the private information.

20. The non-transitory computer-readable medium of claim 18, wherein the instructions are further executable by a computational device to:
store the collected records in a memory outside of the TEE instance.

* * * * *